(12) United States Patent
Xie

(10) Patent No.: US 8,817,466 B2
(45) Date of Patent: Aug. 26, 2014

(54) STYLUS EJECTOR AND PORTABLE ELECTRONIC DEVICE

(75) Inventor: Lang-Ping Xie, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 225 days.

(21) Appl. No.: 13/400,851

(22) Filed: Feb. 21, 2012

(65) Prior Publication Data

US 2013/0070397 A1 Mar. 21, 2013

(30) Foreign Application Priority Data

Sep. 19, 2011 (CN) .......................... 2011 1 0277743

(51) Int. Cl.
| | | |
|---|---|---|
| *G06F 1/16* | (2006.01) | |
| *H05K 5/00* | (2006.01) | |
| *H05K 7/00* | (2006.01) | |
| *G06F 3/033* | (2013.01) | |
| *G06F 3/041* | (2006.01) | |
| *G06K 11/06* | (2006.01) | |
| *G08C 21/00* | (2006.01) | |

(52) U.S. Cl.
USPC ............ 361/679.55; 361/679.56; 361/679.26; 178/19.01; 345/179

(58) Field of Classification Search
USPC ............ 361/679.01, 679.02, 679.03, 679.18, 361/679.26, 679.3, 679.55, 679.56, 679.57, 361/679.58; 178/19.01; 345/179; 81/9.2
See application file for complete search history.

(56) References Cited

U.S. PATENT DOCUMENTS 7,508,383 B2 * 3/2009 Lev et al. ...................... 345/179
7,796,382 B1 * 9/2010 Li ............................. 361/679.58

* cited by examiner

*Primary Examiner* — Hoa C Nguyen
*Assistant Examiner* — Binh Tran
(74) *Attorney, Agent, or Firm* — Novak Druce Connolly Bove + Quigg LLP

(57) ABSTRACT

An ejector for stylus includes a housing, an ejecting module and an operating member. The housing defines a retaining slot for retaining the stylus. The ejecting module includes a pushing member and an elastic member retained in the retaining slot. The pushing member defines a latching slot. The operating member includes an elastic arm and a latching arm extending from the elastic arm. The latching arm includes a latch opposite to the elastic arm. The latch is latched in the latching slot to fix the pushing member in the retaining slot and compressing the elastic member. The latch is detached from the latching slot and the compressed elastic member is released to drive the pushing member to push the stylus out of the retaining slot, when an external force is applied to curve the elastic arm.

14 Claims, 5 Drawing Sheets

STYLUS EJECTOR AND PORTABLE ELECTRONIC DEVICE

BACKGROUND

1. Technical Field

The disclosure generally relates to ejectors for styluses and portable electronic devices using the ejectors.

2. Description of the Related Art

Portable electronic devices such as touch type mobile phones may include styluses for touching and controlling the portable electronic device. The stylus may be tightly retained in a retaining slot of a housing of the electronic device, requiring a strong force to pull the stylus out of the retaining slot.

Therefore, there is room for improvement within the art.

BRIEF DESCRIPTION OF THE DRAWINGS

Many aspects of the exemplary ejector for stylus and portable electronic device using same using same can be better understood with reference to the following drawings. The components in the various drawings are not necessarily drawn to scale, the emphasis instead being placed upon clearly illustrating the principles of the exemplary ejector for stylus and portable electronic device using same using same. Moreover, in the drawings, like reference numerals designate corresponding parts throughout the diagrams.

DETAILED DESCRIPTION

Figure 1:
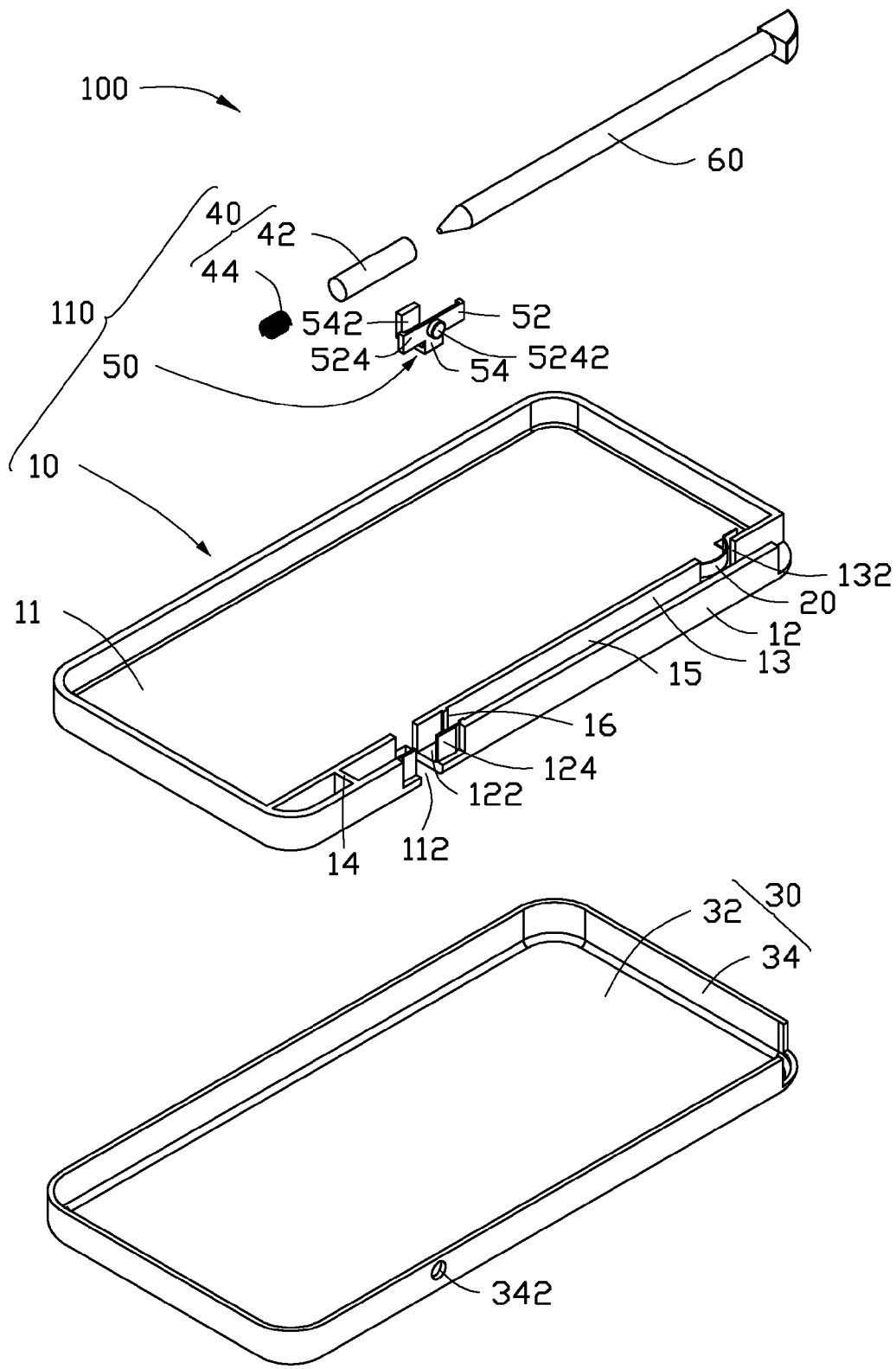
FIGS. 1 and 2 are exploded views of a portable electronic device using the ejector for a stylus according to an exemplary embodiment.
Figure 2:
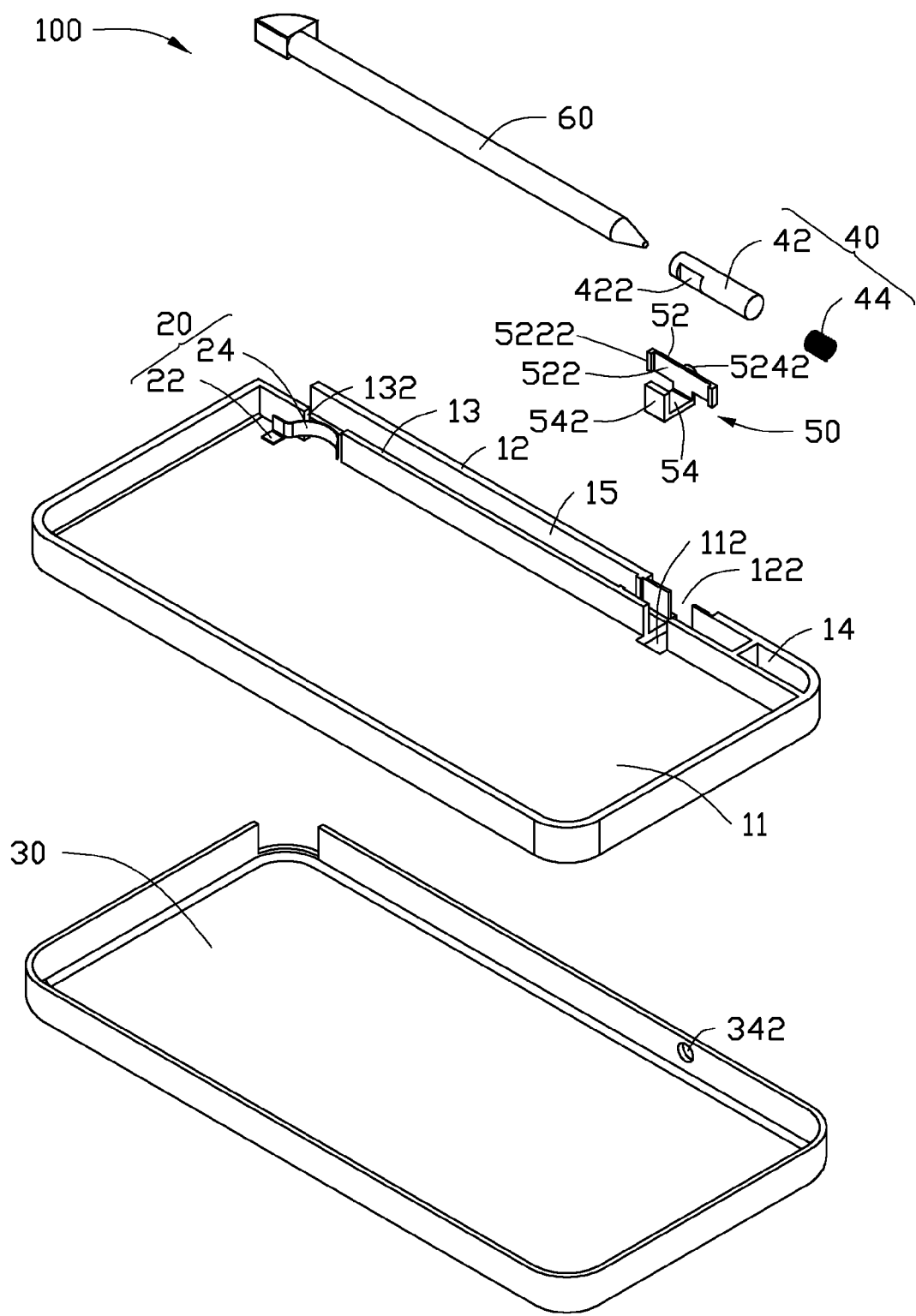

FIGS. 1 and 2 show an exemplary portable electronic device 100 including a housing 10, an elastic clamping member 20 fixed on housing 10, a cover 30, an ejecting module 40, an operating member 50 mounted on the housing 10 and a stylus 60 retained in the housing 10. The housing 10, the ejector 40 and the operating member 50 cooperatively construct an ejector 110 for ejecting the stylus 60 relative to the housing 10.

The housing 10 includes a bottom wall 11, a first side wall 12, a second side wall 13 opposite to the first side wall and a resisting wall 14 connecting the first side wall 12 and the second side wall 13. The housing 10 further defines a retaining slot 15 surrounded by the first side wall 12, the second side wall 13 and the resisting wall 14. The stylus 60 is retained in the retaining slot 15.

The bottom wall 11 defines a sliding groove 112 communicating the retaining slot 15. Both of the first side wall 12 and the second side wall 13 define a through hole 122 communicating with the sliding groove 112 and the retaining slot 15. The first side wall 12 defines two positioning slots 124 beside the through hole 122. The operating member 50 is positioned in the positioning slots 124. The second wall 13 defines a positioning hole 132. The elastic clamping member 20 is positioned in the positioning hole 132. The housing 10 further includes two opposite limiting portions 16 projecting from the first side wall 12 and the second side wall 13.

The elastic clamping member 20 includes a fixing portion 22 and an elastic clamping portion 24 extending from the fixing portion 22. The fixing portion 22 is fixed on the bottom wall 11 of the housing 10. The elastic clamping portion 24 is positioned in the retaining slot 15 through the positioning hole 132.

The cover 30 includes a cover body 32 and a peripheral wall 34 projecting from the cover body 32. The peripheral wall 34 defines a fixing hole 342 communicating the through hole 122.

The ejecting module 40 includes a pushing member 42 and an elastic member 44 resisting against the pushing member 42. The pushing member 42 and the elastic member 44 are retained in the retaining slot 15. The pushing member 42 defines a latching slot 422.

The operating member 50 includes an elastic arm 52 and a latching arm 54 extending from the elastic arm 52. The elastic arm 52 includes a resisting surface 522 and a pressing surface 524 opposite to the resisting surface 522. The elastic arm 52 has two resisting portions 5222 projecting from the resisting surface 522. The resisting portions 5222 resist with each other in the positioning slots 124 of the housing 10. The elastic arm 52 has a protruding portion 5242 projecting from the pressing surface 524. The protruding portion 5242 is fixed in the fixing hole 342.

The latching arm 54 extends from the resisting surface 522. The latching arm 54 includes a latch 542 opposite to the elastic arm 52. The latch 542 is latched in the latching slot 422.

Figure 3:
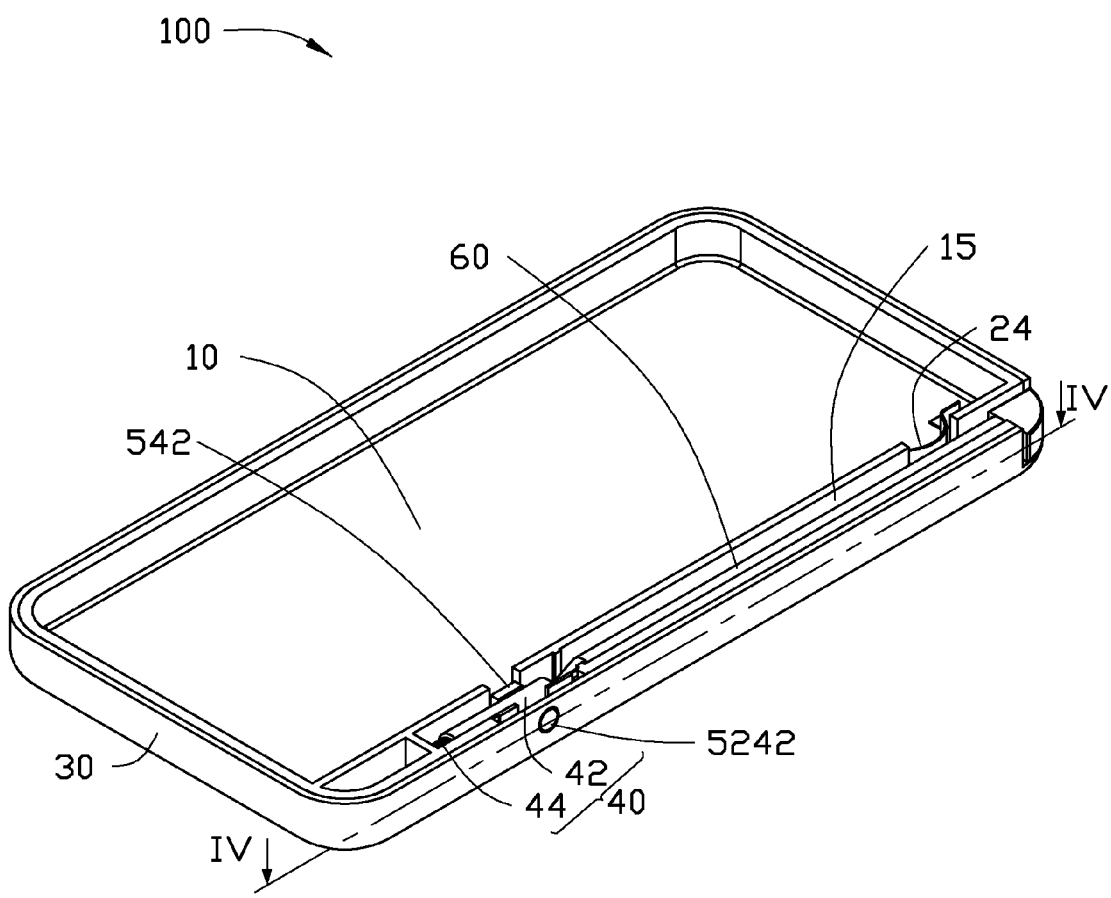
FIG. 3 is an assembled view of the portable electronic device shown in FIG. 1.
Figure 4:
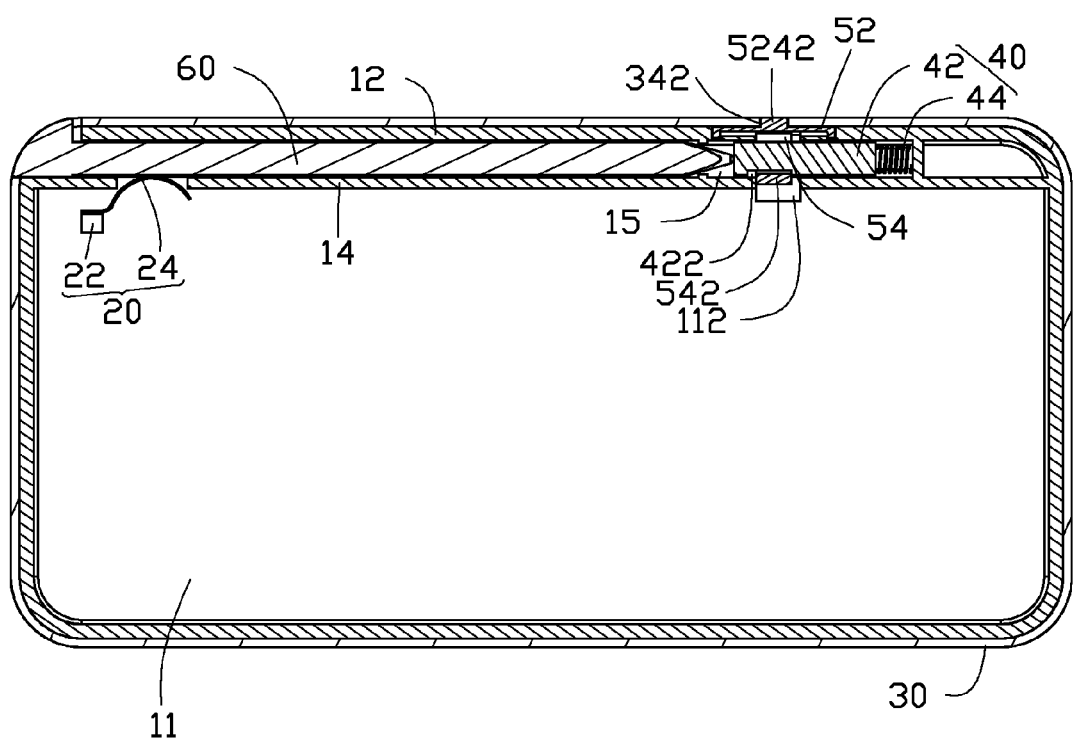
FIG. 4 is a cross-sectional view of the portable electronic device shown in FIG. 3, taken along line a line IV-IV.

In FIGS. 3 and 4, during assembly of the portable electronic device 100, the latching arm 54 is mounted in the sliding groove 122. Each resisting portion 5222 is resisted in a positioning slot 124. The cover 30 covers the housing 10. The peripheral wall 34 of the cover 30 presses the protruding portion 5242 into the fixing hole 342, and the elastic arm 52 is further clamped between the first side wall 12 and the peripheral wall 34.

The pushing member 42 and the elastic member 44 are retained in retaining slot 15. The elastic member 44 is compressed between the pushing member 42 and the resisting wall 14. An external force is applied on the protruding portion 5242, driving the latch 542 to move away from the first side wall 12 along the sliding groove 112. The elastic arm 52 is deformed to accumulate an elastic force over the course of time. Another external force is applied on the pushing member 42 to push the pushing member 42 to compress the elastic member 44. The forces are removed when the latch 542 faces the latching slot 422. The latch 542 is driven into the latching slot 422 by releasing of the elastic force of the elastic arm 52. The stylus 60 is inset to the retaining slot 15 until the stylus 60 resists against the pushing member 42. The stylus 60 is retained in the retaining slot 15 by the pressing force of the elastic clamping portion 24.

Figure 5:
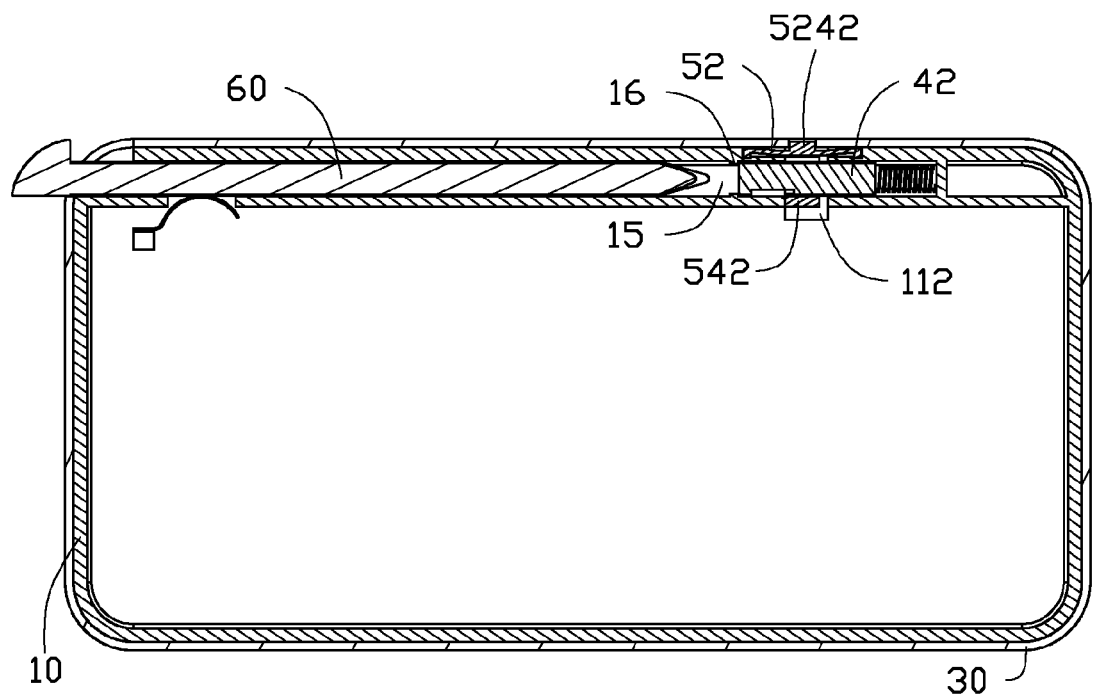
FIG. 5 is similar to FIG. 4, showing the ejector for a stylus is in use.

In FIG. 5, in use, an external pressure is applied on the protruding portion 5242. The protruding portion 5242 deforms the elastic arm 52 to accumulate an elastic force, driving the latch 542 to detach from the latching slot 422. The compressed elastic member 44 is released to drive the pushing member 42 to push the stylus 60 out of the retaining slot 15 until the pushing member 42 resists against the limiting portions 16. At this time, the latch 542 is completely detached from the latching slot 422.

It is to be understood, however, that even through numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An ejector for stylus, comprising:
a housing defining a retaining slot for retaining a stylus and comprising a first side wall that defines two positioning slots;
an ejecting module comprising a pushing member and an elastic member retained in the retaining slot, the pushing member defining a latching slot; and
an operating member mounted on the housing comprising an elastic arm and a latching arm extending from the elastic arm, the latching arm comprising a latch opposite to the elastic arm, the latch latched in the latching slot to fix the pushing member in the retaining slot, compressing the elastic member, the elastic arm having a resisting surface and two resisting portions projecting from the resisting surface, each resisting portion resisted in corresponding one positioning slot to position the operating member to the housing;
wherein, when an external force is applied to deform the elastic arm, the latch is detached from the latching slot and the compressed elastic member is released to drive the pushing member to push the stylus out of the retaining slot.

2. The ejector as claimed in claim 1, wherein the housing further comprises a bottom wall, a second side wall opposite to the first side wall and a resisting wall connecting the first side wall and the second side wall, the first side wall, the second side wall and the resisting wall are projecting from the bottom wall, the retaining slot is surrounded by the first side wall, the second side wall and the resisting wall.

3. The ejector as claimed in claim 2, wherein the housing further comprises two opposite limiting portions for resisting against the pushing member, each limiting portion is projecting from corresponding one side wall.

4. The ejector as claimed in claim 2, wherein the elastic member is compressed between the pushing member and the resisting wall.

5. The ejector as claimed in claim 2, wherein the bottom wall defines a sliding groove, the first side wall and the second side wall define a through hole communicating the sliding groove, the latching arm is slidably mounted in the sliding groove and the through hole.

6. The ejector as claimed in claim 2, wherein the elastic arm further comprises a pressing surface opposite to the resisting surface, the elastic arm has a protruding portion projecting from the pressing surface.

7. A portable electronic device, comprising:
a housing defining a retaining slot and comprising a first side wall that defines two positioning slots;
a stylus retained in the retaining slot;
an ejecting module comprising a pushing member and an elastic member retained in the retaining slot, the pushing member defining a latching slot; and
an operating member comprising an elastic arm and a latching arm extending from the elastic arm, the latching arm comprising a latch opposite to the elastic arm, the latch latched in the latching slot to fix the pushing member in the retaining slot, compressing the elastic member, the elastic arm having a resisting surface and two resisting portions projecting from the resisting surface, each resisting portion resisted in corresponding one positioning slot to position the operating member to the housing;
wherein, when an external force is applied to deform the elastic arm, the latch is detached from the latching slot and the compressed elastic member is released to drive the pushing member to push the stylus out of the retaining slot.

8. The portable electronic device as claimed in claim 7, wherein the housing further comprises a bottom wall, a first side wall, a second side wall opposite to the first side wall and a resisting wall connecting the first side wall and the second side wall, the first side wall, the second side wall and the resisting wall are projecting from the bottom wall, the retaining slot is surrounded by the first side wall, the second side wall and the resisting wall.

9. The portable electronic device as claimed in claim 8, wherein the housing further comprises two opposite limiting portions for resisting against the pushing member, each limiting portion is projecting from corresponding one side wall.

10. The portable electronic device as claimed in claim 7, wherein the elastic member is compressed between the pushing member and the resisting wall.

11. The portable electronic device as claimed in claim 7, wherein the bottom wall defines a sliding groove, the first side wall and the second side wall define a through hole communicating the sliding groove, the latching arm is slidably mounted in the sliding groove and the through hole.

12. The portable electronic device as claimed in claim 7, wherein the elastic arm further comprises a pressing surface opposite to the resisting surface, the elastic arm has a protruding portion projecting from the pressing surface.

13. The portable electronic device as claimed in claim 12, wherein the portable electronic device further comprises a cover covered on the housing, the cover defines a fixing hole, the protruding portion is mounted in the fixing hole.

14. The portable electronic device as claimed in claim 13, wherein the cover comprising a peripheral wall, the elastic arm is clamped between the first side wall and the peripheral wall.

* * * * *